May 8, 1945.   W. G. BURHANS   2,375,345
FILTER
Filed Aug. 21, 1942
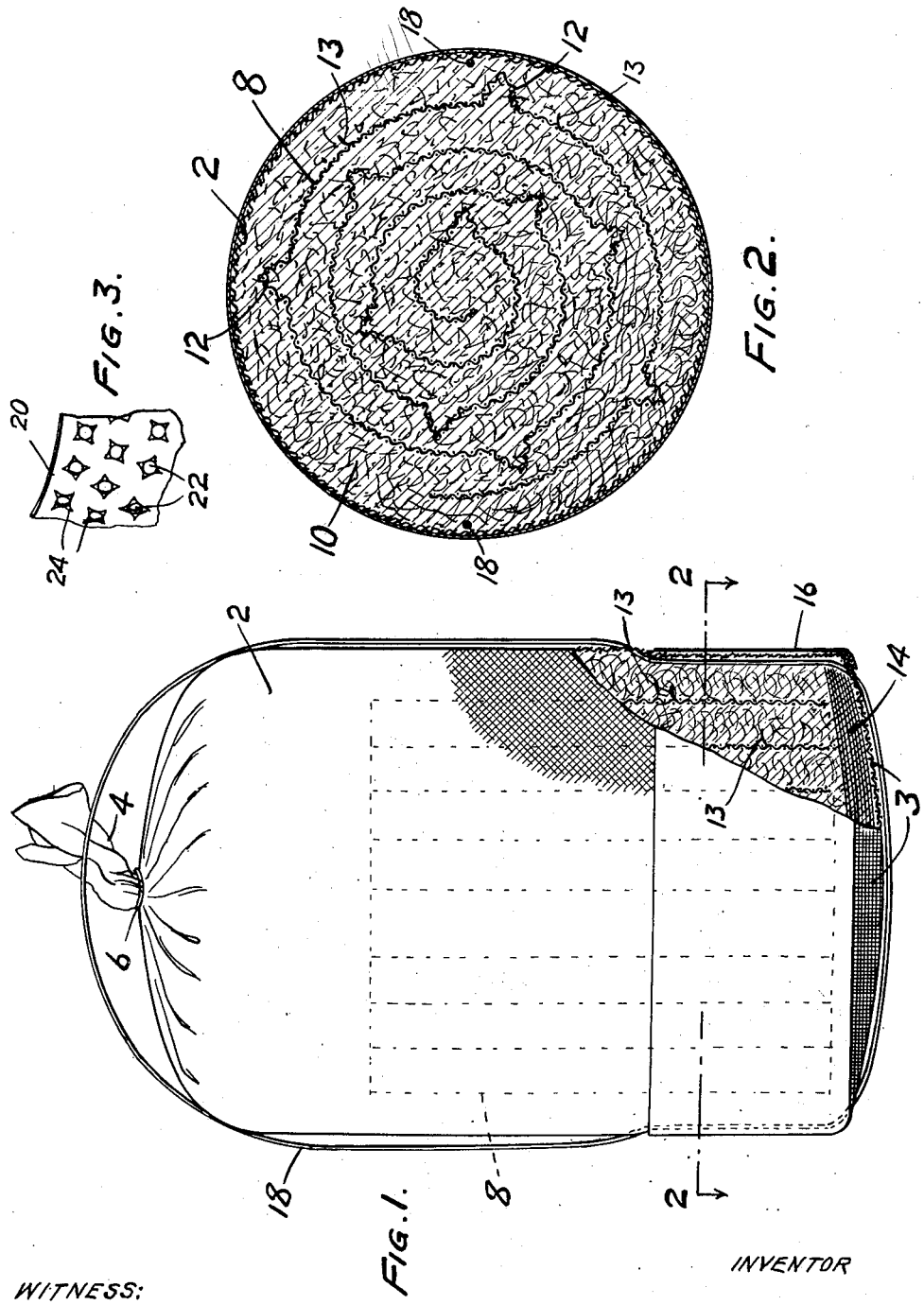
WITNESS:
INVENTOR
William G. Burhans
BY
ATTORNEYS.

Patented May 8, 1945

2,375,345

UNITED STATES PATENT OFFICE 2,375,345

FILTER

William G. Burhans, Kingston, N. Y.

Application August 21, 1942, Serial No. 455,603

2 Claims. (Cl. 210—204)

This invention relates to a filter, and particularly to a replaceable cartridge for the type of oil filter used in connection with internal combustion engines for filtering the oil circulated for lubricating purposes.

This application is, in part, a continuation of my application Serial No. 424,279, filed December 24, 1941.

It is the general object of the present invention to provide a cartridge of the type indicated designed to produce more effective filtration and at the same time provide a long life between replacements of filter cartridges. Cartridges of this type are generally filled with cotton or the like as the filtering material and are subjected to very considerable hydraulic pressures during use. As a result, the cotton waste or other similar material is forced lengthwise of the cartridge, and by reason of being compacted, various portions thereof resist strongly the passage of oil so as to make the cartridge less effective by reduction of the regions in which proper filtration is occurring and through which the oil may relatively freely pass. To overcome this difficulty, it has been customary in the past to prevent lengthwise compression of the cartridge by enclosing therein convolutions of wire mesh between which the filter waste or the like was located. Such a spiral of wire mesh will prevent compression of the cartridge as a whole and greatly aid in maintaining the cotton waste free and capable of rendering a proper filtering action. Besides having this function, the wire mesh tends to promote an even distribution of the oil, giving the cartridge a maximum life.

It is found, however, that the cotton waste between the convolutions of the wire screen would, nevertheless, be compressed to some extent, and one of the objects of the present invention is to minimize the compression thus occurring by causing the convolutions to clamp more tightly the filtering material at spaced locations so as to hold it against endwise slippage in the direction of the axis of the mesh spiral. This feature of the invention is applicable also to the use of a perforated, spiral wound metal sheet in place of a woven wire mesh.

Another object of the invention is the provision of a filter of this general type with a pad of jute for the purpose of improving the filtering action.

These and other objects of the invention, particularly relating to details of construction, will become apparent from the following description, read in conjunction with the accompanying drawing, in which:

Figure 1 is an elevation, partly in section, through a filter cartridge embodying the invention;

Figure 2 is a section through the same taken on the plane the trace of which is indicated at 2—2 in Figure 1; and Figure 3 is a perspective illustration of a portion of a perforated sheet metal or other semi-rigid spiral which may be located within a cartridge instead of a wire mesh screen.

The cartridge in the preferred form illustrated comprises a fabric bag 2 of any suitable construction, but generally comprising a disc-shaped bottom 3 of fairly stiff wire mesh stitched to side walls of cotton fabric or the like, these side walls being brought together as indicated at 4 and secured at their upper ends by means of a wire loop or ring indicated at 6. Within the bag there is located a body consisting of a screen 8 the wires of which may be formed of metal or other moderately rigid material and cotton waste 10 rolled up in a spiral, as indicated in Figure 2. This winding is preferably quite tight with a resulting tendency of the cotton waste and spiral mesh to extend outwardly to force the cartridge into tight engagement with the walls of a container.

In accordance with the present invention, the wire or similar spiral is not smooth, but is crimped at intervals to provide V-shaped projections or ridges 12 between and extending lengthwise of the convolutions of the screen, tightly clamping the cotton waste and thereby serving to hold it against movement under the compression of the oil in the direction of the axis of the spiral. This action may be desirably aided, or may be substituted by, breaking the wire mesh at intervals to cause broken wires to extend outwardly to create a rough surface which will engage and thereby hold the cotton waste. Such broken wires, for example, are indicated at 13.

The wire mesh spiral desirably extends from near the bottom of the cartridge upwardly above the center thereof and may extend throughout substantially its entire height.

In order to afford a better filtering action, a pad 14 comprising layers of jute, may be provided in the bottom of the cartridge immediately above its wire mesh bottom 3. When thus provided, it constitutes a very effective filtering agent preliminary to the passage of the oil through the cotton waste. The wire mesh spiral serves to support this pad of jute so that it cannot be pressed upwardly and punctured by the pressure.

The cartridge may, if desired, be surrounded by a band 16 of sheet metal or semi-rigid plastic material at its lower portion, tending to reduce its diameter locally to less than the inside diameter of a receiving casing. The portion of the bag above the band 16 tends to expand and is normally in tight engagement with the interior of the casing.

In Figure 3, there is illustrated a fragment of a perforated spiral of sheet metal which may take the place of the screen 8. This is indicated at 20 as provided with openings 22 from which there project outwardly sharp edges indicated at 24, arranged to engage and thereby prevent lengthwise movement of the cotton waste or other similar fibrous filter material. Such a perforated metal sheet may be used and arranged in a fashion identical to that of the wire mesh screen, desirably being crimped to clamp the fibrous material, such as cotton waste or the like, used as the main filtering medium.

The cartridge is designed to be used in a casing of conventional character, for example as illustrated in my Patent No. 1,910,747, dated May 23, 1933, or in said application Serial No. 424,279, or my application Serial No. 294,127, filed September 9, 1939. As illustrated in the last named application, the band 16 may be perforated if desired to permit entrance of oil therethrough into the side of the cartridge. In any case, the cartridge tightly engages the cylindrical walls of the casing, and the oil to be filtered is forced vertically upwardly therethrough, the casing being provided with an inlet below the cartridge and an outlet above the same. In order that the cartridge may be readily removed from the casing for replacement purposes, it may be provided with a wire bail as indicated at 18, threaded through it and passing below its wire mesh bottom 3.

During operating the cartridge is forced under high pressure upwardly against the top of, or a cap member within, a casing. Collapse under the pressure is prevented by the spiral screen and additionally by the presence of the jute pad and the stiff wire mesh bottom 3. The projecting ridges, or projecting wires or prongs, prevent the fibrous waste from sliding upwardly. Not only is the jute pad an excellent filter, but it provides across itself a substantial pressure drop relieving the waste of the action of excessive pressures such as may arise when the oil and lubricated parts are quite cold.

What I claim and desire to protect by Letters Patent is:

1. A filter cartridge comprising a fabric bag having a pervious bottom, a foraminous semi-rigid spiral member within said bag, and fibrous filtering material between convolutions of said spiral member, the convolutions of said member having portions in the form of prong-like elements projecting from their faces and engaging said fibrous material.

2. A filter cartridge comprising a fabric bag having a pervious bottom, a wire mesh spiral member within said bag, and fibrous filtering material between convolutions of said spiral member, the convolutions of said member having portions in the form of prong-like elements projecting from their faces and engaging said fibrous material.

WILLIAM G. BURHANS.